June 24, 1958  J. D. CLYMER  2,840,108
SAFETY DISCONNECT VALVE WITH SWIVEL JOINTS
Filed Nov. 1, 1955
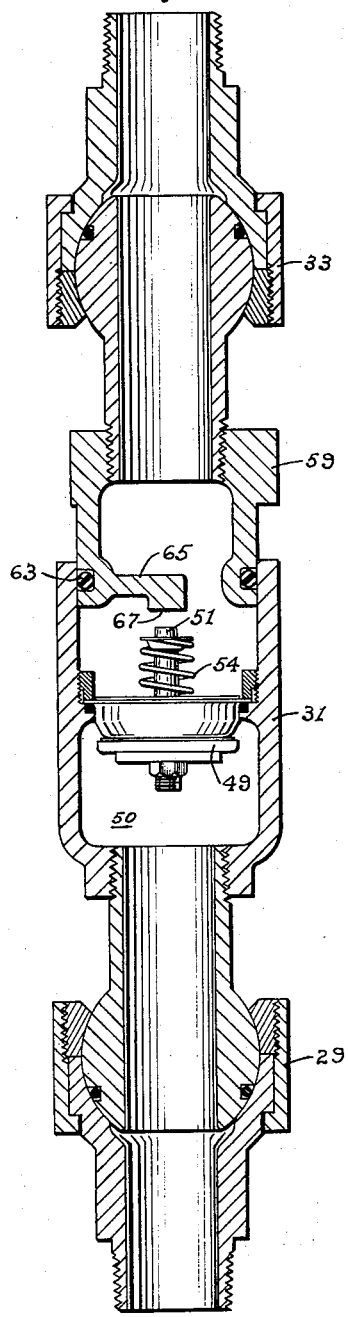
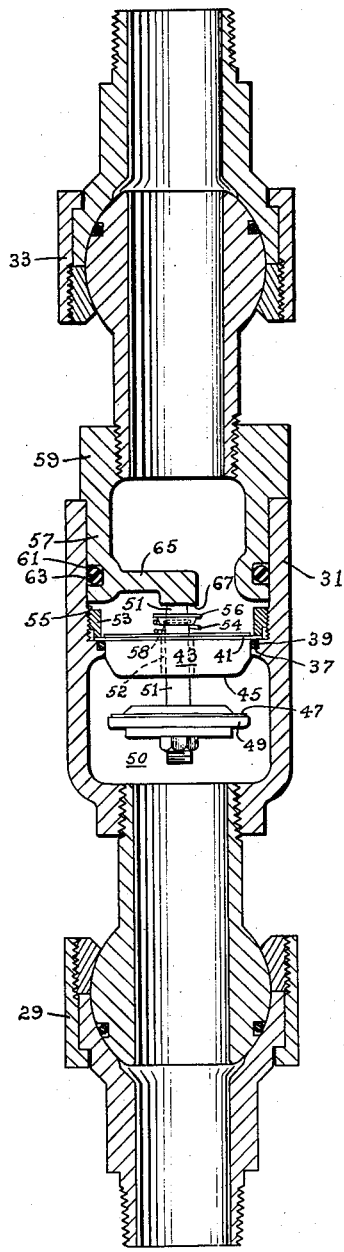
INVENTOR.
JOSEPH D. CLYMER
BY
*Edmund W. E. Kamm*
ATTORNEY United States Patent Office 2,840,108
Patented June 24, 1958

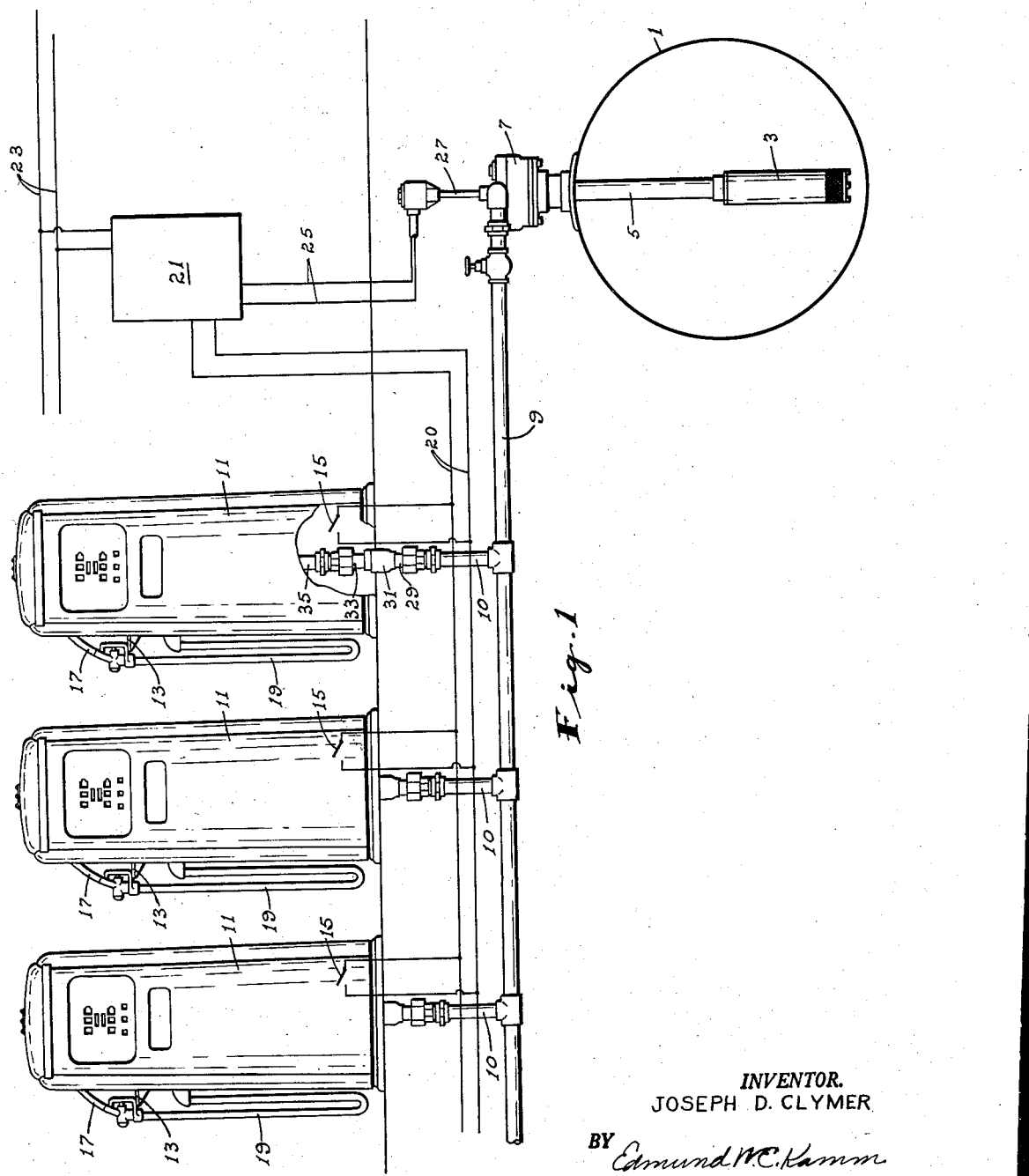

2,840,108

SAFETY DISCONNECT VALVE WITH SWIVEL JOINTS

Joseph D. Clymer, Fort Wayne, Ind., assignor to Tokheim Corporation, Fort Wayne, Ind., a corporation of Indiana Application November 1, 1955, Serial No. 544,224

4 Claims. (Cl. 137—565)

This invention relates to a safety disconnect valve with swivel joints. More specifically it relates to a valve of the type described which is particularly adapted for use with a gasoline dispensing system, particularly one which employs a pump located at a station remote from one or more dispensing pedestals.

In such a system the pipes leading to all of the pedestals contain hazardous liquid which is under pressure at any time that any pedestal connected to the system is being operated. Thus if any one of the non-operated pedestals accidentally suffers a collision impact severe enough to break the discharge pipe leading thereto, the liquid will gush from the pipe serving that pedestal and a serious fire hazard would be created, quantities of a relatively expensive liquid will be lost and the system will be rendered unfit for further operation. The operator, who may be at a point remote from the damaged pedestal, might not even be aware of the accident and accordingly might permit the system to continue operating so that the liquid would continue to flow and thus increase the hazard and the loss of expensive liquid.

It is therefore an object of the invention to provide a mechanism located at the inlet of each pedestal of the system which will permit the pedestal to shift with the blow in a manner to minimize the danger of breaking the delivery pipe.

Another object of the invention is to provide a connection between the pedestal and delivery pipe which will permit the pedestal to pull entirely away from the pipe.

A further object of the invention is to provide a valve mechanism which will close the delivery pipe automatically if the pedestal shifts beyond a predetermined limit or if it is pulled away from the pipe.

It is another object of the invention to provide a valve mechanism which is provided with ball joints at each end for attachment to the delivery pipe and the pedestal respectively.

Yet another object of the invention to provide a slip joint between the valve body and the ball joint which is to be connected with the pedestal.

A further object of the invention to provide a valve which is held open against the flow of liquid by the slip joint so that when the movable portion of the joint is displaced beyond a predetermined point, the valve will be closed.

It is a further object of the invention to provide means for closing an outlet which has been damaged so that the other system outlets may continue to be used.

These and other objects will become apparent from a study of this specification and the drawings which are attached hereto, made a part hereof and in which:

Figure 1 is a schematic view of a remote type dispensing system.

Figure 2 is sectional view of the valve and joint mechanism in the normal operating position.

Figure 3 is a view similar to that of Figure 2 showing the valve closed as the result of displacement of the pedestal.

Referring first to Figure 1, the numeral 1 represents a storage tank for gasoline or other liquid in which is disposed a submerged pump-motor unit 3 which is connected by discharge pipe 5, through header 7 to the delivery pipe 9 which has various branches or discharge stubs 10, each of which is connected to a pedestal 11.

The latter comprises the usual meter, computer, reset and interlock mechanism, hose hook 13, switch 15 which is operated by the hose hook under control of the interlock mechanism. A valved nozzle 17 is adapted to be supported on the hook when the latter is in the power-off position and cannot be supported on the hook when the latter is in the power-on position. The nozzle is connected to the meter by a hose 19 and other piping. The structure of the pedestal may be like that shown in application Serial Number 186,815 for Liquid Fuel Dispensing Apparatus filed September 26, 1950, now Patent Number 2,732,103, issued January 24, 1956.

The switches of the various pedestals are preferably connected in parallel by wires 20 to the starter 21 which is connected to the main 23 and to the motor of the pump by wires 25 which enter the motor through the conduit 27. The movement of any one of the hose hooks to power-on position will close a switch 15, energize the starter and start the pump motor in a well known manner.

It should be understood that the motor-pump unit need not be a submerged type of unit but may be of the submerged pump-above tank motor or both elements of the unit may be disposed outside of the tank. The main distinguishing feature of the system under discussion is that the motor-pump unit is located remotely from the pedestal or pedestals.

Each outlet or stub 10 of delivery pipe 9, is fitted with a ball joint 29 which screws into one end of the valve body 31. A second ball joint 33 is screwed into the piston head 59 and is connected with the inlet pipe 35 of the pedestal. The ball joints may be of any conventional construction.

The valve body is provided with a radial inwardly extending flange 37 on which is seated an O-ring gasket 39 which is compressed between flange 37 and a flange 41 on the valve body 43. The latter is provided with a seat 45 against which, in sealing relation, the seat portion 47 of the poppet type valve 49 will be forced by the flow of liquid into the valve chamber 50 under conditions to be outlined below. The valve stem 51 is guided in the bearing 52 of the valve body and projects through it. A valve spring 54 is compressed between the body 43 and spring seat 56 which is supported on the valve stem by a split ring 58.

The valve body is held in position on the gasket by the locking ring 53 which is threadedly mounted in the body.

The end of the valve body opposite the chamber 50 is provided with an extensible conduit comprising an axial cylindrical bore 55 and a piston 57, which fits bore 55 and has a head 59 adapted to receive one end of ball joint 33. The piston is provided with circumferential groove 61 which receives an O-ring 63 to insure a seal between the piston and bore.

A radially inwardly extending arm 65 on the piston terminates in a pad or boss 67 which is in axial alignment with bearing 52. The pad supports the end of the valve stem and normally holds the valve open. As the piston is withdrawn from the cylinder for any reason, the pad will move axially away from the valve stem which will be moved toward closed position by the spring. In the event liquid is flowing through the body 31, the flow will aid in the valve movement.

OPERATION

Assuming that the system is in the inoperative condition and that a delivery is to be made from a selected pedestal, the operator will remove the nozzle 17 from the hose hook 13 and move the latter to the power-on position. This closes switch 15, energizes the starter 21 through lines 20 and the starter in turn energizes the motor-pump unit 3.

Liquid under pressure passes from the pump through pipe 5, header 7, pipe 9, stub 10, swivel joint 29, valve body 31, swivel 33, pipe 35, the meter, hose 19 and nozzle 17 to the customer's tank. All of the other pedestals in the system will be pressurized at least to the pipe 35 at the same time.

In the event one of the pedestals of the system is bumped sufficiently to tilt it tip it over or displace it laterally in any direction on the island, the distance between the center points of the swivels will be lengthened. This lengthening would normally break the usual delivery pipe and result in a flood of gasoline over the island.

In the instant case however, the lengthening is accomplished by movement of the piston 57 in the cylinder 55 without breaking the line. Also, as the piston moves away from the valve, the latter will close to prevent flow of liquid to the pedestal.

The two ball joints also permit tilting of pipe 35 as well as lateral translation thereof without applying excessive bending action to either pipe 35 or stub 10, thereby minimizing the chance of breaking either of them.

The pedestals are rarely bolted to the island. Therefore it will be seen that ordinary collisions with the pedestal will probably do little damage to the equipment because it is substantially free to move. Severe collisions will probably displace the pedestal from the island but in either case the delivery line will not be broken because the piston 57 may be pulled entirely out of the cylinder 55 if the pedestal is displaced far enough laterally or if it is tipped over by the impact.

This prevents flooding of the island and service area, prevents the creation of the fire hazard resulting therefrom and, what is also very important, it permits operation of the system to be carried on with the remaining pedestals regardless of whether or not the damaged pedestal is repaired or replaced immediately. Further, to restore the outlet to service, it is necessary merely to compress the piston into the cylinder. The pad 67 will reopen valve 49 and when a pedestal is connected, the outlet is again operative.

In the event the pedestal was only displaced, merely centering it over the stub will usually restore the piston to its proper place in the cylinder and open the valve.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

What is claimed is:
1. In a liquid dispensing system comprising a tank, a delivery pipe having a number of rigid branch pipes, connected to withdraw liquid from the tank and discharge it under pressure into said delivery pipe and branch pipes, a number of dispensing pedestals each having a rigid inlet pipe and a switch connected to start and stop said motor pump, the improvement which includes a valve body defining a valve port, a universal joint connecting a valve body to each branch pipe, valve means disposed in said body for movement with the flow of liquid therethrough to close said port, yieldable means for urging said valve means closed, a cylinder defined by said body outwardly of said port, a piston sealingly mounted for reciprocation in said cylinder toward and away from said port and defining an outlet passage, a hollow universal joint connected to said piston and to the inlet pipe of a pedestal, said piston having a normal position adjacent the port and being movable away from said port by lateral displacement or tipping of said pedestal relative to said branch pipe and means on the piston and engageable with said valve means in the normal position of the piston, for holding said valve means open and movable away from said valve means with said piston to permit closing of the valve means, when said piston is displaced from its normal position, so as to prevent the discharge of liquid from the associated branch pipe even though a pedestal switch is closed, said yieldable means serving to close and hold said valve closed independently of the operation of said motor pump.

2. The structure defined by claim 1 which includes a stem on said valve means disposed to extend toward said piston and an element mounted on said piston and disposed to engage said stem to hold said valve means open when said piston occupies its normal position.

3. The structure defined by claim 1 wherein said cylinder has an open end remote from the port so that said piston may move entirely out of said cylinder upon radial displacement of said pedestal relative to said branch pipe.

4. The structure defined by claim 2 wherein said piston is of the skirted type and said stem engaging element comprises an arm extending inwardly from said skirt to a position in which it engages said stem.

References Cited in the file of this patent
UNITED STATES PATENTS

| | | |
|---|---|---|
| 375,253 | Bersch | Dec. 20, 1887 |
| 424,780 | Gold | Apr. 1, 1890 |
| 750,053 | Hall | Jan. 19, 1904 |
| 939,211 | Brown | Nov. 9, 1909 |
| 957,087 | Peterson | May 3, 1910 |
| 1,459,100 | Henning | June 19, 1923 |
| 1,914,736 | Coutu | June 20, 1933 |
| 2,048,387 | Johnsen | July 21, 1936 |
| 2,054,561 | Greenberg | Sept. 15, 1936 |
| 2,732,100 | Jackson | Jan. 24, 1956 |